United States Patent [19]
Kato et al.

[11] 3,864,308
[45] Feb. 4, 1975

[54] NOVEL PHOTOSENSITIVE POLYMER

[75] Inventors: Masao Kato, Yokohama; Masaki Hasegawa, Tokyo; Taro Ichijyo, Kamakura, all of Japan

[73] Assignee: Agency of Industrial Science & Technology, Tokyo, Japan

[22] Filed: June 8, 1972

[21] Appl. No.: 261,015

Related U.S. Application Data

[63] Continuation-in-part of Ser. No. 46,836, June 16, 1970, abandoned.

[30] Foreign Application Priority Data

| June 17, 1969 | Japan............ 44-47753 |
| June 17, 1969 | Japan............ 44-47754 |
| Dec. 19, 1969 | Japan............ 44-192745 |
| Dec. 19, 1969 | Japan............ 44-192746 |
| Dec. 25, 1969 | Japan............ 44-1455 |
| Dec. 25, 1969 | Japan............ 44-1456 |
| Apr. 14, 1970 | Japan............ 45-31827 |

[52] U.S. Cl............. 260/47 UA, 96/115, 117/161, 260/47 UA, 260/62, 260/63 UY, 260/80.3 E, 260/82.3, 260/86.7, 260/823

[51] Int. Cl......... C08f 3/34, C08f 7/00, C08f 15/02

[58] Field of Search................ 96/115 P, 115 R; 260/47 UA, 62, 78.4 N, 78.5 N, 89.3, 86.7

[56] References Cited

UNITED STATES PATENTS

| 2,934,526 | 4/1960 | Hoffmann............ 260/88.1 |
| 3,721,648 | 3/1973 | Ehrig............ 260/47 UA |

*Primary Examiner*—Christopher A. Henderson
*Attorney, Agent, or Firm*—Ernest G. Montague; Karl F. Ross; Herbert Dubno

[57] ABSTRACT

A composition is produced by combining one or more members selected from the group consisting of $\omega$-vinyloxyalkyl cinnamate, $\omega$-vinyloxyalkyl styrylacrylate and homologs thereof with a cationic polymerization catalyst. This composition is polymerized or copolymerized to form a novel photosensitive polymer. The product of polymerization or copolymerization is a linear polymer or linear copolymer in which only the vinyl group is polymerized and the photosensitive group is quantitatively retained in the side chain. This polymer or copolymer enjoys a high degree of photosensitivity and permits the photocrosslinking reaction to occur uniformly.

4 Claims, 2 Drawing Figures

NOVEL PHOTOSENSITIVE POLYMER

REFERENCE TO RELATED APPLICATION:

This is a continuation-in-part of our copending application Ser. No. 46,836 filed June 16, 1970 now abandoned.

This invention relates to a novel photosensitive polymer. More specifically, the present invention relates to a photosensitive polymer in which only the vinyl group is polymerized and an unsaturated group represented by the generic formula:

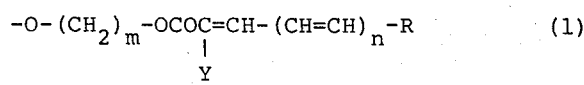
$$-O-(CH_2)_m-OCOC=CH-(CH=CH)_n-R \qquad (1)$$
$$|$$
$$Y$$

(wherein Y is a hydrogen atom or a cyano group, R is a phenyl or a substituted phenyl, the substituent in the aromatic ring is selected from among halogens and nitro, lower alkyl, methoxy, acetyl, benzoyl and cyano group, m is an integer having the value of 2 – 4 inclusive and n is 0 or an integer having the value of (1) is contained in the side chain.

The photosensitive resins of photo-dimerization type which have been known to date include those photosensitive resin compositions containing, as photosensitive components thereof, compounds of the type having cinnamic acid attached in the form of esters to polyvinyl alcohols or compounds of the type having benzalacetophenone introduced into the aromatic ring of polystyrene. In the case of these photosensitive resin compositions which are obtained by such polymer reaction, the introduction of photosensitive group into the backbone polymer chain cannot be accomplished with uniformity. Consequently, they provide ununiform photoreaction, tend to induce such undesirable phenomena as fogging and defy all efforts to improve the photosensitivity over a certain level.

The photosensitive polymer of the present invention is very simple to manufacture and has a structure in which the characteristic group capable of conferring photosensitivity is introduced completely into the backbone polymer chain.

The photosensitive polymer according to the present invention contains as its photosensitive component the linear cationic polymer or linear cationic copolymer obtained by homopolymerizing or copolymerizing a compound represented by the generic formula in the presence of a cationic catalyst:

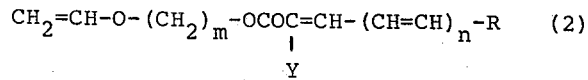
$$CH_2=CH-O-(CH_2)_m-OCOC=CH-(CH=CH)_n-R \qquad (2)$$
$$|$$
$$Y$$

(wherein, Y, m, n, and R have the same meaning as in formula (1) above).

Thus, the polymerization or copolymerization product of the present invention is of a type which has had only the vinyl group or moiety thereof undergo addition polymerization and contains an unsaturated group represented by the generic formula:

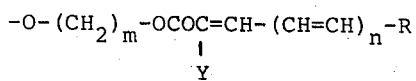
$$-O-(CH_2)_m-OCOC=CH-(CH=CH)_n-R$$
$$|$$
$$Y$$

(wherein, Y, m, n and R have the same meaning as in formula (1) above).

The polymer or copolymer of the said compound retains the unsaturated carboxylic acid-ester group by the medium of a methylene group, enabling the photosensitive group to enjoy improved mobility within the polymer. This permits the polymer itself to manifest increased activity and enhanced photosensitivity. The subscript 'n' in the generic formula (2) is either 0 or the integer 1. The unsaturated carboxylic ester group becomes an equivalent to a cinnamic acid-ester group where n is 0. It becomes an equivalent to β-styrylacrylic acid-ester group where n is 1.

The polymer of this invention has a structure in which only the vinyl group is polymerized and a group of the generic formula (1) serving as the photosensitive group is incorporated in the side chain. This photosensitive group is invariably contained from the beginning in the starting monomer, so that it is introduced quite regularly and completely into the linear polymer to be formed of that monomer. As a result, the photosensitive polymer of this invention enjoys a higher degree of sensitivity than the conventional photosensitive polymers and permits the photosensitizing reaction to proceed uniformly. Further, the polymer exhibits outstanding behavior as a photoresist, provides good softness and high adhesiveness and shows excellent photographic resolution.

Accordingly, it is highly suitable for the production of precision printing plates, integrated circuits, large scale integrated circuit, etc.

As previously mentioned, linear copolymers obtained by using chain polymerizable compounds other than those compounds represented by the aforesaid general formula (2) are also embraced by this invention. Selection of these chain polymerizable compounds, therefore, enables produced linear polymers to acquire any desired degree of photosensitivity for different purposes.

It is the main object of this invention to provide a novel, industrially useful linear polymer possessed of very high photosensitivity.

Other objects and characteristic features of the present invention will become apparent to those skilled in the art from the following, more detailed description of the invention.

In the drawing

Figure 1:
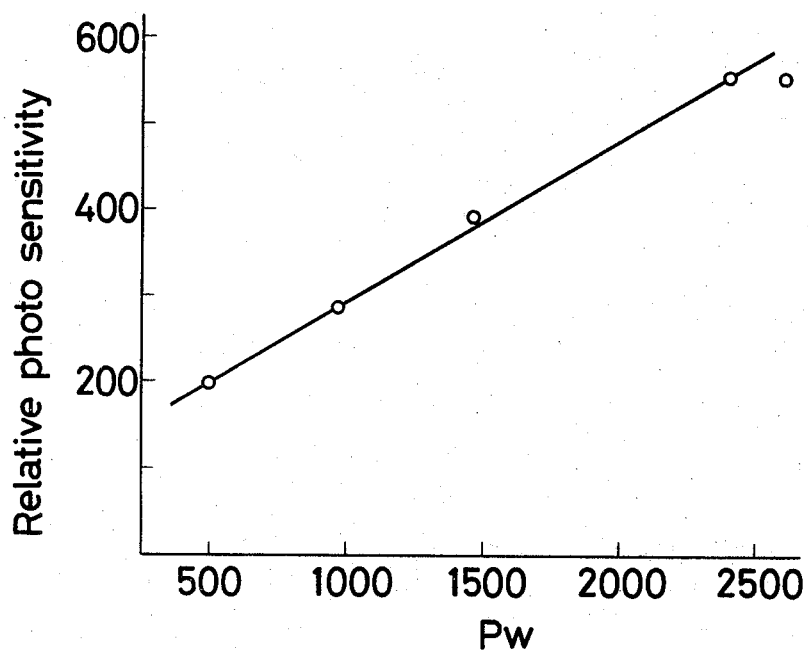
FIG. 1 shows one example of the relationship between the polymerization degree and the photosensitivity as determined of a photoresist formed of the polymer of the present invention.

The compound of the generic formula (2) which is the raw material for the polymer of this invention is a novel compound which has not yet been reported in literature. In addition to being useful as the raw material for the aforesaid photosensitive polymer, this compound can advantageously be used as the intermediate for the production of cross-linking agents and various kinds of organic compounds. An explanation is now given to the synthesis of this novel compound. The following two methods are available for the purpose of this synthesis:

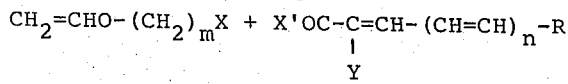

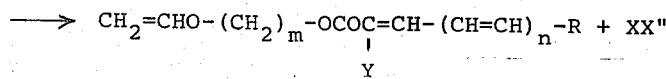

(1)

(wherein, X is a halogen, X' is either OH or an alkali metal salt such as ONa or OK, Y, R, $m$, and n have the same meaning as in formula (1) above, and X'' is H or an alkali metal).

For catalyzing this reaction, there is generally used a mixed catalyst consisting of a trialkylamine and a lower halogenated alkyl. Especially when X' is OH, the amount of trialkylamine to be used with reference to the amount of the lower halogenated alkyl is greater than the equivalent weight required for the formation of a quaternary ammonium salt. Where X' is ONa or OK, i.e., an alkali metal salt of OH, the amount of trialkylamine to be used is exactly the equivalent weight. By so selecting the amount of trialkylamine, a mixture of the resultantly formed quaternary ammonium salt with a trialkylamine may be used in the former case and only the quaternary ammonium salt may be used in the latter case, respectively as the catalyst.

The reaction may be carried out without a solvent or in the presence of such a solvent as dioxane or dimethyl formamide. Optionally the rate at which this reaction proceeds may be regulated by suitably cooling or heating the reaction system.

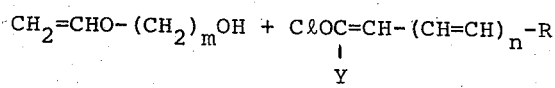

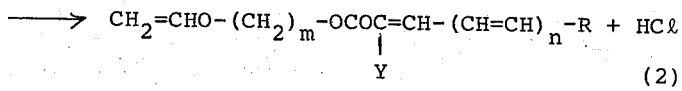

(2)

(wherein, Y, R, $m$ and $n$ have the same meaning as in equation (1) above).

This reaction proceeds smoothly when it is carried out in the presence of such a basic catalyst as pyridine or triethylamine. The reaction may be carried out without a solvent or in the presence of such a solvent as dioxane or dimethyl formamide. The regulation of the reaction temperature may be performed similarly to the case of the aforesaid reaction (1).

The Ψ-vinyloxyalkyl esters of cinnamic acid, styrylic acid, and their homologous acids and the derivatives of the esters include β-vinyloxyethyl cinnamate, β-vinyloxyethyl m-methylcinnamate, β-vinyloxyethyl-α-cyanocinnamate, γ-vinyloxypropyl cinnamate, δ-vinyloxybuthyl cinnamate, β-vinyloxyethyl-styrylacrylate, γ-vinyloxypropyl-p-methylstyryl acrylate, γ-vinyloxypropyl-styrylacrylate and δ-vinyloxybutyl styrylacrylate, for example.

Now, an explanation is given of the method by which the novel photosensitive polymer of this invention is produced by using the aforesaid novel compound as the raw material.

The photosensitive high molecular polymer of this invention is produced by polymerizing one or two or more kinds of the aforesaid novel compound or copolymerizing such novel compound with one or more monomers selected from the group consisting of chain polymerizable unsaturated compounds of the type described hereinafter.

Examples of the chain polymerizable unsaturated monomer are such cationically polymerizable compounds as alkylvinyl ethers, alkylisoalkenylvinyl ethers, olefins, alkylstyrenes, halostyrenes, isoalkenylstyrenes, vinyl carbazole, vinyldioxoranes, dialkoxyethylenes, butadiene and isoprene.

The polymers and copolymers to be obtained consequently are invariably novel compounds which have never been reported in literature. It is essential that the polymerization or copolymerization should be carried out in the presence of a cationic catalyst.

As the cationic polymerization catalyst, there may be used one or more well-known compounds such as boron trifluoride, etherification product thereof, stannic chloride, aluminum chloride, aluminum sulfate, titanium chloride, zinc chloride and sulfuric acid.

The amount of the catalyst to be used is from 0.001 to 10 percent, preferably from 0.01 to 5 percent, by weight based on the monomer.

No complete polymerization is obtained when the amount is below the lower limit of 0.001 percent by weight. When the amount exceeds the upper limit of 10 percent by weight, however, the molecular weight of the resultant polymer fails to reach the desired level, though the velocity of polymerization reaction may be increased.

The polymerization may be carried out without a solvent or in the presence of a solvent.

As the solvent, there may be used one or more solvents which are inactive to cationic polymerization. Examples are benzene, toluene, methylene chloride, ethylene chloride, nitromethane, carbon tetrachloride and nitrobenzene.

Generally, the monomer concentration is in the range of from 0.5 to 90 percent by weight, though the practically desirable range is from 1 to 70 percent by weight.

The polymerization is generally carried out at temperatures in the range of from −130° to 70°C.

The polymerization is carried out generally by following an ordinary procedure, with due precautions exercised to prevent water from entering the polymerization system. On completion of the polymerization, a small amount of ammonia, pyridine or some other weakly basic substance is introduced into the solution so as to inactivate the catalyst. The solution may be concentrated and preserved in that form as occasion demands. Otherwise, this solution may be poured into an alcohol or some other suitable non-solvent containing a small proportion of the aforesaid weakly basic substance so as to liberate and refine the polymer contained therein.

The polymer which is produced by the method mentioned above is a novel composition having a structure in which only the vinyl group is polymerized and an unsaturated group of the generic formula.

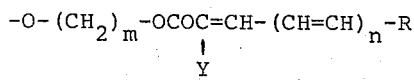

(wherein, $m$, $Y$, $Z$ and $n$ have the same meaning as in formula (1) above) is retained in the side chain.

The method by which the aforesaid structure of this novel polymer has been confirmed is described.

The description is first made with respect to ω-vinyloxyalkyl-cinnamate or ω-vinyloxyalkyl styrylacrylate, for example. A soluble polymer is obtained in high yields when the said ester is subjected to cationic polymerization in benzene, toluene or methylene chloride as the solvent, using borontrifluoride etherate or stannic chloride as the catalyst.

This reaction affords a high molecular-weight polymer (at least 0.7 in reduction viscosity, 1 g/dl) in a quantitative yield.

From the infrared spectra of these polymers which are dealt with hereinafter, it is confirmed that the polymerization produces a novel polymer possessed of a special structure in which only the vinyl group moiety of the molecule has selectively taken part in the polymerization reaction and a cinnamic acid residue, a styrylacrylic acid residue or a residue homologous thereto has been retained intact in the side chain.

To be specific, the infrared spectra of ω-vinyloxyalkyl cinnamate and homologous monomers show an absorption band by $CH_2=CH-$ group (ω-vinyloxyalkyl group) each near 820 cm$^{-1}$ and 960 cm$^{-1}$ and an absorption band by $-CH=CH-$ (trans) group near 975 cm$^{-1}$. In the infrared spectra of the corresponding cation polymerization products, the absorption bands near 820 cm$^{-1}$ and 960 cm$^{-1}$ have completely disappeared but the absorption band near 975 cm$^{-1}$ has remained. Further, the remaining absorption band is found to have the same intensity as the absorption band observed in the case of monomers.

The infrared spectra of ω-vinyloxyalkyl styrylacrylate and homologous monomers show an absorption band by ω-vinyloxyalkyl group each near 820 cm$^{-1}$ and 960 cm$^{-1}$ and an absorption band by $-CH=\lambda$ $CH-CH=CH-$ (trans-trans) group near 1000 cm$^{-1}$. In the infrared spectra of the corresponding cationic polymerization products, the absorption bands near 820 cm$^{-1}$ and 960 cm$^{-1}$ have completely disappeared and the absorption band near 1000 cm$^{-1}$ has remained. This remaining absorption band is found to have the same intensity as the absorption band observed in the case of monomers.

Also in the case of the copolymerization of ω-vinyloxyalkyl cinnamate, ω-vinyloxyalkyl-styrylacrylate, and homologs thereof with the aforementioned cationically polymerizable monomers such as isobutylvinyl ether and α-methyl styrene which are generally known to exhibit cationic polymerizability, it has been confirmed by the infrared spectrum analysis that soluble copolymers retaining the structure of cinnamic acid residue, styrylacrylic acid residue and residue homologous thereto quantitatively in the side chain are obtained in satisfactory yields similarly to those in the case of homopolymerization.

As will become evident from the working examples to be cited hereinafter, these polymers and copolymers are obtained in very high yields and are soluble.

When the polymers of the present invention are put to uses for which photosensitivity is one requirement, they may, as occasion demands, contain photosensitizers, fillers, thermal polymerization inhibitors and the like which are popularly used as auxiliary ingredients.

The photosensitizers which are popularly used include 5-nitroacenaphthene, picramide, benzophenone, 4,4'-dimethoxybenzophenone, 4-chlorobenzophenone, 4,4'-dichlorobenzophenone, benzoin, benzoinmethyl ether, anthraquinone, β-methylanthraquinone, β-tertiary butyl anthraquinone, and acetophenone. The fillers which can be used for this purpose include such inorganic substances as glass powder and silica and such synthetic resins as polyethylene, polypropylene, polymethacrylate, polyamide, and polyethylene terephthalate. The thermal polymerization inhibitors suitable for the present purpose are hydroquinone, pyrogallol, methylene blue, phenol and n-butylphenol, for example.

When the polymer composition of this invention is exposed to the sunlight or to the rays from a xenon lamp, mercury lamp, carbon arc or some other similar light source, the aforementioned homopolymer or copolymer which is the photosensitive component undergoes cross-linking reaction and is consequently insolubilized.

On account of this nature, the composition can be used as a photosensitive resin for the production of photoresist, resin plate for printing and photosetting bonding agent. It may also be used as the raw material for the production of film and other molded articles.

The high molecular polymer of this invention possesses outstanding properties as photoresist. This fact is explained with respect to a photoresist formed by using poly β-vinyloxyethylcinnamate, for example.

FIG. 1 shows the relationship between the photosensitivity and the polymerization degree Pw. The values of photosensitivity shown in the diagram are those measured based on the photosensitivity, taken as 100, of a representative photoresist made from the known polyvinyl cinnamate and placed under identical conditions.

The photosensitivity is seen to increase with the increasing degree of polymerization. The diagram shows that the photoresist made of the polymer of this invention has photosensitivity two to six times as high as that of the photoresist made of the conventional countertype.

Further, the photographic resolution is extremely high, so that lines even smaller than 1 μ in thickness can be reproduced readily.

Figure 2:
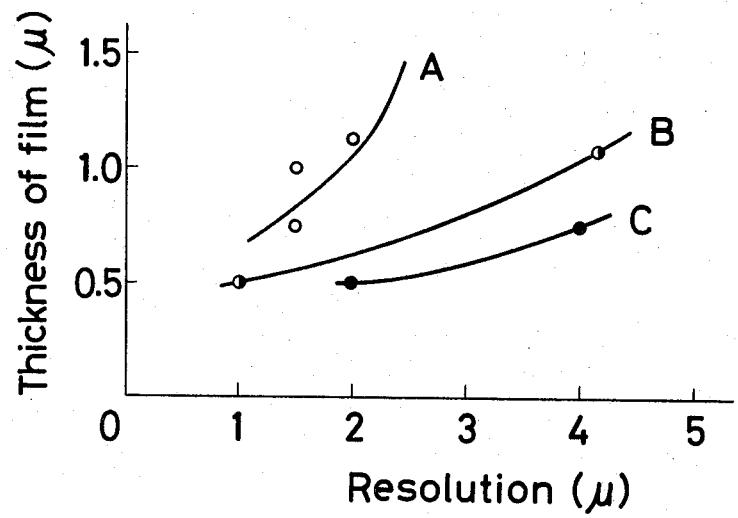
FIG. 2 shows one example of the relationship between the film thickness and the photographic resolution as determined of a photoresist formed of the polymer of the present invention.

FIG. 2 depicts the relationship between the film thickness (in μ) and the photographic resolution (in μ) (using a negative of silver emulsion glass mask) as observed on different photoresists. In the diagram, the curve A represent the photoresist made of the polymer of the present invention, the curve B the photoresist made of the known mixture of cyclized rubber and azide compound, and the curve C the photoresist made of the known polyvinyl cinnamate. From the curves, the photoresist formed of the polymer of the present invention is found to enjoy an outstanding advantage in that the decline of photographic resolution due to increase in the film thickness is extremely small compared with the photoresists made of the aforesaid known materials. It has high stability against heat and is not affected at all by the air at the time of image development. The resist film contains very few pinholes and possesses sufficient durability against the etching liquid of hydrogen fluoride. When the film formed of the photosensitive composition of this invention is exposed to rays through a negative film held fast against it and subsequently treated with a suitable solvent such as trichlene, benzene, toluene, chloroform, carbon tetrachloride or ethylene dichloride, the unexposed portion of the film is washed away and the exposed portion remains intact. Thus, the film produces a relieved image.

Now, the substance of this invention is described in further detail with reference to some preferred embodiments. It is noted that the present invention is not limited thereto in any way.

EXAMPLE 1 (Manufacture of β-vinyloxyethyl cinnamate)

34.0g of sodium cinnamate, 1.0g of methyl triethyl ammonium iodide and 0.5g of hydroquinone were added to 180 ml of 2-chloroethyl vinyl ether. The mixture obtained was refluxed under agitation for 4 hours and thereafter allowed to stand at normal room temperature for 1 hour. The resultant precipitate was separated by filtration and washed twice with 20 ml of 2-chloroethyl-vinyl ether, with the washings combined with the mother liquor. The mother liquor was concentrated under reduced pressure to recover excess 2-chloroethyl-vinyl ether and, at the same time, produce crude β-vinyloxyethyl cinnamate. This crude product was purified through distillation effected under reduced pressure.

Yield: 40.4g   Boiling point: 116 to 118°C/0.05 mmHg
Results of elementary analysis
Calculated ($C_{13}H_{14}O_3$)   C 71.54%, H 6.47%
Found                             C 71.49%, H 6.43%
(Manufacture of polymer)

In a moistureproof flask fitted with a calcium chloride tube, a solution of 1.045g of β-vinyloxyethyl cinnamate in 10 ml of toluene was cooled to −78°C and combined, while under agitation at the temperature, with 0.021g of boron trifluoride etherate. At the same temperature, the agitation was continued for 2 hours. After polymerization, the content of the flask was diluted with toluene and poured into a large volume of methanol containing a small volume of ammonia to obtain a white polymer.

The yield was 0.934g and the reduction viscosity (1.07 g/dl) was 0.678 (THF. 30°C).

(CONFIRMATION OF POLYMER STRUCTURE)

The infrared spectrum of β-vinyloxyethyl cinnamate showed absorptions due to $CH_2=CH-$ group (p-vinyloxyalkyl group) near 820 $cm^{-1}$ and 960 $cm^{-1}$ and an absorption due to $-CH=CH-$ (trans) group near 975 $cm^{-1}$, whereas the absorptions near 820 $cm^{-1}$ and 960 $cm^{-1}$ were completely out of sight and the absorption near 975 $cm^{-1}$ remained in the infrared spectrum of the products of the cationic polymerization. And, the absorption was of the same intensity as that of the monomer.

(TREATMENT OF PHOTOSENSITIVE POLYMER)

The polymer thus obtained was dissolved in benzene. The solution was formed into a film on a glass plate and exposed for 8 minutes to a high pressure mercury lamp (100 W) placed at a distance of 15 cm. Consequently, the film was completely insolubilized. When a solution prepared by combining the polymer with about 3 wt% of 5-nitroacenaphthene and picramide was formed into a film in dark place and exposed to the mercury lamp for 1.5 minutes. Consequently, the film was simularly insolubilized.

EXAMPLE 2 (Manufacture of β-vinyloxyethyl cinnamate copolymer)

1.09g of β-vinyloxyethyl cinnamate and 0.50g of isobutyl vinyl ether were dissolved in 14.00g of toluene. This solution was cooled to −78°C and combined while under agitation, with 0.03g of boron trifluoride etherate. At the same temperature, agitation was continued for 1 hour. The contents of the flask were subjected to the same after-treatment as in Example 2, to obtain a white copolymer.

The yield was 1.57g and the reduced viscosity (1.07 g/dl) was 1.87.

(TREATMENT OF PHOTOSENSITIVE POLYMER)

The polymer was dissolved with benzene and formed into a film. When this film was exposed for 8 minutes to the mercury lamp by the same method as used in Example 1, the film was completely insolubilized.

EXAMPLE 3 (Manufacture of β-vinyloxyethyl α-cyano cinnamate)

A mixture having 19.5g of sodium α-cyano cinnamate, 0.5g of methyl triethyl ammonium iodide and 0.3g of hydroquinone added to 100 ml of 2-chloroethyl-vinyl ether was refluxed under agitation for 4 hours and thereafter allowed to stand at normal room temperature for 1 hour. The resultant precipitate was separated by filtration and washed twice with 10 ml of 2-chloroethyl-vinyl ether, with the washing combined with the mother liquor.

By following the procedure of Example 1 from that point forward, there was obtained the product.

Yield: 19.9g   Boiling point: 137 to 139°C/0.07 mmHg
Results of elementary analysis
Calculated ($C_{14}H_{15}NO_3$)   C 69.12%, H 5.39%, N 5.76%
Found                              C 69.19%, H 5.32%, N 5.69%
(Manufacture of polymer)

(MANUFACTURE OF POLYMER)

A solution of 1.00g of β-vinyloxyethyl-α-cyano cinnamate in 9.00g of toluene was cooled to −40°C and combined, while under agitation, with 0.02g of boron trifluoride etherate. At this temperature, agitation was continued for 30 minutes. The polymer was isolated by adding excess methanol containing ammonia to the content.

The yield was 0.97g.

EXAMPLE 4 (Manufacture of β-vinyloxyethyl-3-methyl cinnamate)

A mixture having 8.8g of 2-hydroxyethyl-vinyl ether and 19.9g of 3-methyl cinnamoyl chloride added to 100 ml of pyridine was heated to 40°C under agitation retained at this temperature for 2 hours and thereafter allowed to stand overnight at normal room temperature.

The reaction product was sufficiently washed with water to obtain an oily crude product. In the presence of 0.1g of hydroquinone added thereto, the crude product was purified through distillation effected under reduced pressure.

Yield: 28.2g      Boiling point: 123 to 127°C/0.4 mmHg
Results of elementary analysis
    Calculated ($C_{13}H_{14}O_3$)      C 71.54%, H 6.47%
    Found      C 71.60%, H 6.39%
    (Manufacture of polymer)

A mixture of 1.00g of β-vinyloxyethyl-3-methyl cinnamate in 9.00g of toluene was cooled to −78°C and combined, while under agitation with 0.01g of boron trifluoride etherate. At the same temperature, agitation was continued for 2 hours. The contents were subjected to the same after-treatment as used in Example 1, to obtain a white polymer.

The yield was 0.95g and the reduced viscosity (1.05 g/dl) was 0.593.

(TREATMENT OF PHOTOSENSITIVE POLYMER)

The polymer was dissolved in tetrahydrofuran and formed into a film. When this film was exposed for 6 minutes to the mercury lamp by the same method as used in Example 1, the film was completely insolubilized.

EXAMPLE 5 (Manufacture of β-vinyloxyethyl-β-styryl acrylate)

A mixture having 9.8g of sodium β-styryl acrylate, 0.24g of methyl triethyl ammonium iodide and 0.1g of hydroquinone added to 50 ml of 2-chloroethyl vinyl ether was refluxed under agitation for 5 hours and thereafter allowed to stand at normal room temperature for 1 hour. The resultant precipitate was separated by filtration and washed twice with 10 ml of 2-chloroethyl-vinyl ether, with the washings combined with the mother liquor. By carrying out the subsequent reaction and after-treatment in the same manner as in Example 1, there was obtained the following product.

Yield: 9.5g      Boiling point: 145 to 150°C/0.2 mmHg
Results of elementary analysis
    Calculated ($C_{15}H_{16}O_3$)      C 73.75%, H 6.60%
    Found      C 73.73%, H 6.51%
    (Manufacture of polymer)

A mixture of 1.00g of β-vinyloxyethyl-β-styryl acrylate in 9.00g of toluene was cooled to −40°C and combined, while under agitation, with 0.02g of boron trifluoride etherate. At the same temperature, agitation was continued for 3 hours. The contents were subjected to the same after-treatment as used in Example 1, to obtain a white polymer.

The yield was 0.99g and the reduced viscosity (1.15 g/dl) was 0.412.

The polymer was dissolved in benzene. The solution was formed into a film on a glass plate and exposed to the mercury lamp for 6 minutes according to the method of Example 1. Consequently, the film was completely insolubilized.

EXAMPLE 6 (Manufacuture of β-vinyloxyethyl-β-styryl acrylate copolymer)

A solution of 1.22g of β-vinyloxyethyl-β-styryl acrylate and 0.50g of isobutyl vinyl ether in 13.00g of toluene was cooled to −45°C and combined, while under agitation, with 0.034 g of boron trifluoride etherate. At the same temperature, agitation was continued for 3 hours. The contents were subjected to the same after-treatment as used in Example 1 to obtain a white copolymer.

The yield was 1.70g and the reduced viscosity (1.07 g/dl) was 1.00.

What is claimed is:

1. A photosensitive homopolymer having a polymerized vinyl chain with repetitive units of the formula

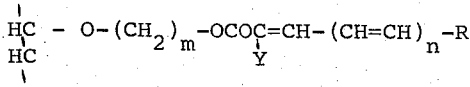

wherein Y is a hydrogen atom or a cyano group, R is a phenyl or a substituted phenyl, the substituent present in the aromatic ring of said substituted phenyl being one member selected from the group consisting of halogens, nitro, lower alkyl, methoxy, acetyl, benzoyl and cyano groups, m is an integer having the value of 2-4 inclusive and n is 0 or 1.

2. A photosensitive copolymer having a polymerized vinyl chain consisting of repetitive ethylene units and having appended to each of said ethylene units, a group having the formula

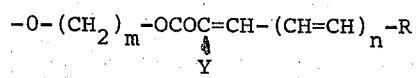

wherein Y is a hydrogen atom or a cyano group, R is a phenyl or a substituted phenyl, the substituent present in the aromatic ring of said substituted phenyl being one member selected from the group consisting of halogens, nitro, lower alkyl, methoxy, acetyl, benzoyl and cyano groups, m is an integer having the value of 2-4 inclusive and n is 0 or 1, and wherein said copolymer contains at least two different appending groups which differ in at least one of Y, R, m and n.

3. A photosensitive copolymer consisting of a polymerized vinyl chain containing (1) substituted ethylene units having the formula

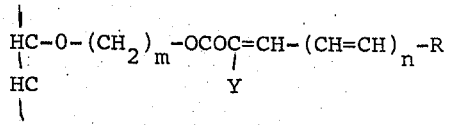

wherein Y is a hydrogen atom or a cyano group, R is a phenyl or a substituted phenyl, the substituent present in the aromatic ring of said substituted phenyl being one member selected from the group consisting of halogens, nitro, lower alkyl, methoxy, acetyl, benzoyl and cyano groups, $m$ is an integer having the value of 2–4 inclusive and $n$ is 0 or 1, and also containing (2) polymerized vinyl units in said chain in addition to said substituted ethylene units (1), the said substituted ethylene units (1) being in an amount sufficient so that said copolymer is photosensitive.

4. The photosensitive copolymer of claim 3 wherein said polymerized vinyl units (2) are produced by the polymerization of at least one monomer selected from the group consisting of alkylvinyl ethers, alkylisoalkenylvinyl ethers, olefins, alkylstyrenes, halostyrenes, isoalkenylstyrenes, vinyl carbazole, vinyldioxoranes, dialkoxyethylenes, butadiene and isoprene.

* * * * *